United States Patent

Koyama et al.

[11] Patent Number: 5,912,704
[45] Date of Patent: Jun. 15, 1999

[54] VTR WITH DIGITALLY-INTERFACED CAMERA UNIT AND VIEWFINDER

[75] Inventors: Toshio Koyama, Tokyo; Michiko Mochizuki, Kanagawa; Kayano Hashimoto, Kanagawa; Satoshi Yamamoto, Kanagawa, all of Japan

[73] Assignee: Sony Corporation, Japan

[21] Appl. No.: 08/037,683

[22] Filed: Mar. 25, 1993

Related U.S. Application Data

[63] Continuation of application No. 07/778,592, Oct. 17, 1991, abandoned.

[30] Foreign Application Priority Data

Nov. 6, 1990 [JP] Japan .................................... 2-300284

[51] Int. Cl.⁶ .................................................. H04N 5/225
[52] U.S. Cl. ........................................... 348/333; 348/222
[58] Field of Search ..................................... 358/209, 224, 358/229, 909, 21 R, 17, 160; 348/207, 222, 333, 334, 373, 374, 375, 376, 325; H04N 5/30, 5/225

[56] References Cited

U.S. PATENT DOCUMENTS

| | | | |
|---|---|---|---|
| 4,589,020 | 5/1986 | Akatsuka | 358/160 |
| 4,814,876 | 3/1989 | Horio et al. | 358/160 |
| 4,837,817 | 6/1989 | Maemori | 358/224 |
| 4,928,137 | 5/1990 | Kinoshita | 358/213.26 |
| 4,945,424 | 7/1990 | Hiroki et al. | 358/335 |
| 5,060,074 | 10/1991 | Kinugasa et al. | 358/224 |
| 5,065,246 | 11/1991 | Takemoto et al. | 358/227 |
| 5,077,612 | 12/1991 | Megrgardt et al. | 358/209 |
| 5,142,272 | 8/1992 | Kondo | 358/17 |

FOREIGN PATENT DOCUMENTS 3407304   9/1984   Germany ..................... G03B 17/14

*Primary Examiner*—Tuan V. Ho
*Attorney, Agent, or Firm*—Rader, Fishman & Grauer; Ronald P. Kananen

[57] ABSTRACT

A video camera is comprised of a camera unit having a signal processing circuit supplied with an imager signal from its imager device and which converts the imager signal to a digital video signal and a viewfinder having a decoder supplied with the digital video signal from the signal processing circuit of the camera unit through a bus and which decodes the digital video signal to provide a signal which is to be displayed on a display device as an image. Thus, the quality of image displayed on the display device can be improved comparatively and the arrangement of the video camera can be simplified.

4 Claims, 2 Drawing Sheets

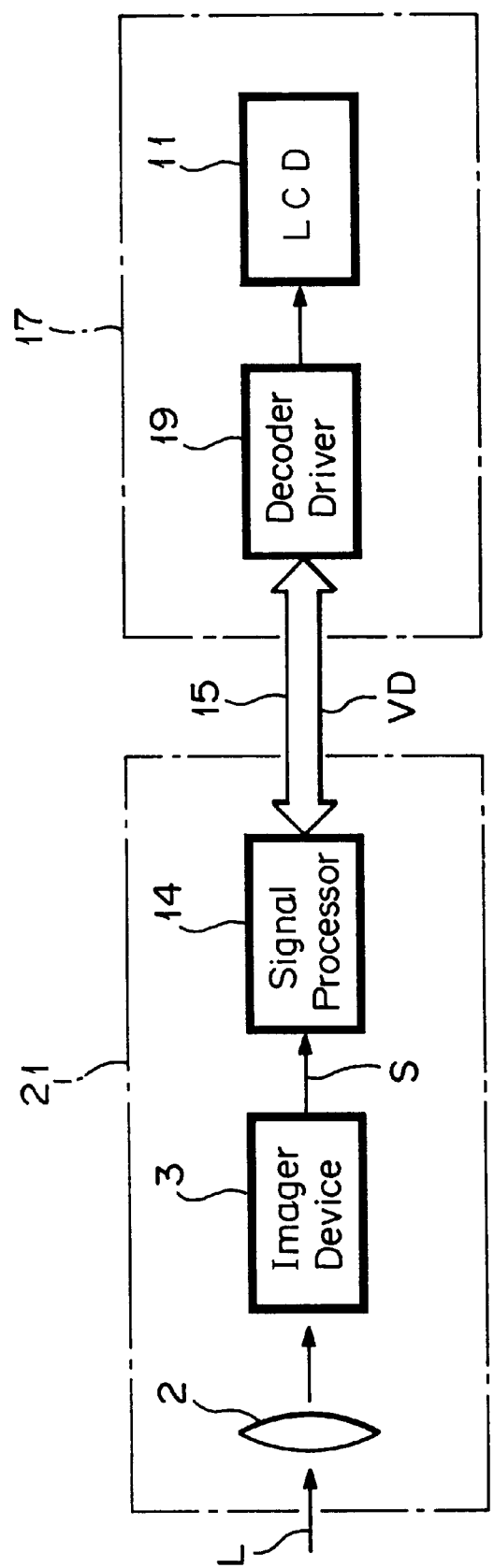

VTR WITH DIGITALLY-INTERFACED CAMERA UNIT AND VIEWFINDER

This application is a continuation of application Ser. No. 07/778,592 filed Oct. 17, 1991, now abandoned.

BACKGROUND OF THE INVENTION

1. Field of the Invention

The present invention generally relates to video cameras and, more particularly, is directed to a video camera suitably applied to a video tape recorder (VTR) having a built-in camera which has an electronic viewfinder.

2. Description of the Prior Art

Conventional video cameras have been designed to employ electronic viewfinders and the main reasons that the an electronic viewfinder is employed may be as follows. That is, if the electronic viewfinder is employed, there are then the advantages such that an image (based on a signal recorded on a record medium) photoelectrically-converted by an objective lens and an imager device or the like can be directly visually confirmed, which can focus an image accurately and that the creation of picture including the characteristics of the imager device or the like can be made correctly.

FIG. 1 shows an arrangement of a video camera according to the prior art. As shown in FIG. 1, in a camera unit 1, a light L having image information is converted into an imager signal S which is an electrical signal via an objective lens 2 and an imager device 3 such as a charge-coupled device (CCD) or the like. The imager signal S is supplied to a signal processor circuit 4, in which it is processed to provide a composite analog video signal V.

The composite video signal V is supplied through a line 5 to a Y/C separating circuit 8 which forms a part of a viewfinder 7 and separated into a Y signal (luminance signal) and a C signal (color signal) by the Y/C separating circuit 8. The Y signal and the C signal are supplied to a decoder 9, in which they are decoded to provide three primary red (R), green (G) and blue (B) signals. These R, G and B signals are supplied to a liquid crystal display (LCD) driver 10. Further, a composite synchronizing signal CS is detected from the Y signal by the decoder 9 and the composite synchronizing signal CS is supplied to a timing generator 12. The timing generator 12 supplies the LCD driver 10 with a read clock signal CK synchronized with the composite synchronizing signal CS. Thus, an image signal based on the R, G, B signals and the clock signal CK are supplied from the LCD driver 10 to a liquid crystal display (LCD) 11, whereby a color image based on the composite video signal V is displayed on the picture screen of the LCD 11.

However, in the above conventional video camera, since the composite video signal V supplied from the camera unit 1 to the viewfinder 7 is an analog signal, the waveform of the analog composite video signal V is distorted by a stray impedance of the line 5 or the like or the waveform of the signal is distorted due to the filter-processing or the like in the Y/C separating circuit 8. Thereby the quality of an image on the picture screen of the LCD 11 is deteriorated.

OBJECTS AND SUMMARY OF THE INVENTION

Accordingly, it is an object of the present invention to provide an improved video camera having an electronic viewfinder in which the aforementioned shortcomings and disadvantages encountered with the prior art can be eliminated.

More specifically, it is an object of the present invention to provide a video camera having an electronic viewfinder in which the quality of an image displayed on a liquid crystal display of the viewfinder can be improved.

As an aspect of the present invention, a video camera is comprised of a camera unit having a signal processing circuit supplied with an imager signal from an imager device and which converts the imager signal to a digital video signal and a viewfinder having a decoder supplied with the digital video signal from the signal processing circuit of the camera unit through a bus and which decodes the digital video signal to provide a signal which is to be displayed on a display device as an image. Thus, the quality of image displayed on the display device can be improved comparatively and the arrangement of the video camera can be simplified.

The above and other objects, features, and advantages of the present invention will become apparent in the following detailed description of an illustrative embodiment thereof to be read in conjunction with the accompanying drawing, in which like reference numerals are used to identify the same or similar parts.

BRIEF DESCRIPTION OF THE DRAWINGS

FIG. 2 is a block diagram showing an arrangement of an embodiment of a video camera according to the present invention.

DETAILED DESCRIPTION OF THE PREFERRED EMBODIMENT

Figure 1:
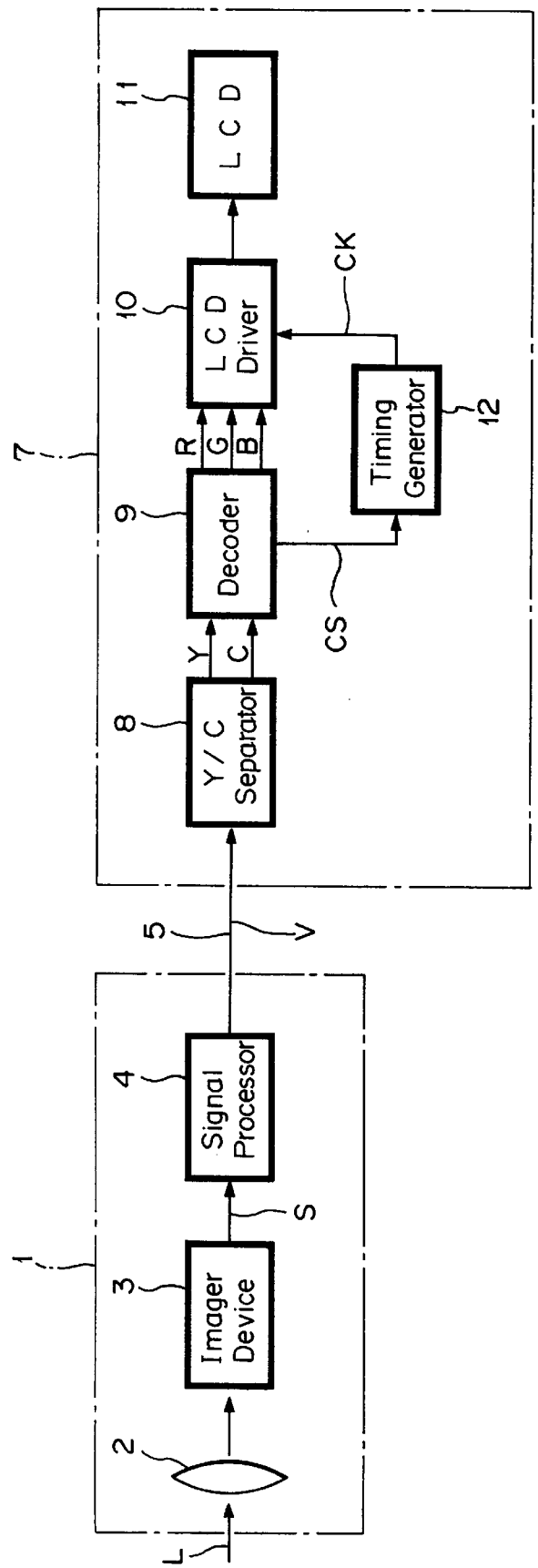
FIG. 1 is a block diagram showing an arrangement of a video camera according to the prior art.

An embodiment of a video camera according to the present invention will hereinafter be described with reference to FIG. 2. In FIG. 2, like parts corresponding to those of FIG. 1 are marked with the same references and therefore need not be described in detail.

FIG. 2 shows the arrangement of the video camera according to the embodiment of the present invention. Referring to FIG. 2, it will be seen that the video camera of this embodiment is comprised of a camera unit 21 and a viewfinder 17. The camera unit 21 includes a signal processor circuit 14 and the signal processor circuit 14 includes a microcomputer, an analog-to-digital (A/D) converter and a memory, though not shown. As earlier noted, the light L having the image information is converted into the imager signal S by the objective lens 2 and the imager device 3 such as the CCD or the like and this image signal S is supplied to the signal processor circuit 14. The signal processor circuit 14 is controlled by the microcomputer so as to allow the A/D converter to convert the imager signal S into a digital video signal VD of 8 bits or the like.

The digital video signal VD is supplied through a bus 15 to a decoder driver 19 which forms a part of the viewfinder 17. The digital video signal VD supplied to the decoder driver 19 is decoded to provide an analog video signal and this analog video signal is supplied to the LCD 11, whereby an image of high fidelity corresponding to the digital video signal VD is displayed on the picture screen of the LCD 11.

As described above, according to this embodiment, the imager signal S is converted into the digital video signal VD and this digital video signal VD is supplied through the bus 15 to the viewfinder 17 side. In this case, since the original signal of the digital video signal VD can be accurately reproduced so long as the distorted signal waveform of the digital video signal VD due to the stray impedance or the like falls within a predetermined range of distortion, the image displayed on the LCD 11 can be represented as the image faithful to the imager signal S. Thereby the quality of image is increased comparatively. In actual practice, as compared with the example of the prior art shown in FIG. 1, the Y/C separating circuit 8 or the like can be removed so that a distortion of the signal waveform can be reduced comparatively.

Since it is sufficient that the decoder driver 19 has a function to decode the digital video signal VD to provide the analog video signal as described above, the decoder driver 19 can be constructed by a digital circuit IC (integrated circuit) of a relatively simple arrangement. In actual practice, as compared with the video camera of the example according to the prior art shown in FIG. 1, the Y/C separating circuit 8, the timing generator 12 or the like can be removed, which can reduce the circuit assembly parts by about 30 parts, thus resulting in the manufacturing cost being reduced.

A bidirectional information communication between the camera unit 21 and the viewfinder 17 can be effected by means of the bus 15 so that the viewfinder 17 can be arranged to have its own peculiar function. For example, only in the viewfinder 17 side, the color adjustment can be effected in accordance with user's taste by the microcomputer on the camera unit 21 side.

While the video camera of this embodiment employs the LCD which can display a color image as described above, the display apparatus is not limited to the color LCD and a monochromatic LCD; a color cathode ray tube (color CRT) and a monochromatic CRT can be utilized.

As set out above, according to the present invention, the imager signal from the imager device is converted into the digital video signal by the signal processing circuit provided on the camera unit side and this digital video signal is supplied through the bus to the viewfinder side. Also, this digital video signal is decoded by the decoder provided on the viewfinder side and then displayed on the picture screen of the display device in the viewfinder side. In this case, since the original signal of the digital video signal can be accurately reproduced so long as the distorted signal waveform of the digital video signal due to the stray impedance or the like falls within a predetermined range of distortion, the image displayed on the display device can be represented as the image faithful to the imager signal, thereby the quality of image being increased comparatively.

Further, as compared with the prior art, the signal processing in the viewfinder can be simplified so that the circuit arrangement of the viewfinder can also be simplified, which can reduce the circuit assembly parts. There is then the advantage that the manufacturing cost can be reduced.

A bidirectional information communication between the camera unit and the viewfinder can be effected by means of the bus so that the viewfinder can be arranged to have its own additional peculiar function, wherein the color adjustment can be effected only in the viewfinder side.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A video tape recorder (VTR) having a built-in video camera comprising:
    a camera unit having an imager device for receiving a light image and converting said light image into an analog image signal representative thereof, and a signal processing circuit supplied with said analog image signal from said imager device and providing a video digital output signal representative thereof for transmission in digital form to a viewfinder for said camera, said signal processing circuit including a microcomputer for controlling said signal processing circuit, and an analog-to-digital converter to convert the analog image signal to a digital output signal; and
    a bus transmitting said video digital output signal from said signal processing circuit to said viewfinder and for providing bidirectional communication between said camera unit and said view finder;
    said viewfinder having a decoder supplied with said digital video output signal from said signal processing circuit of said camera unit through said bus, said decoder providing an analog output signal representative of said digital video signal thereof, and a liquid crystal display device for receiving said analog output signal from said decoder and providing an image representative thereof which is displayed on said liquid crystal display device.

2. A video tape recorder (VTR) having a built-in video camera comprising:
    a camera unit having an imager device for receiving a light image and converting said light image into an analog imager signal representative thereof, and a signal processing circuit supplied with said analog imager signal from said imager device and providing a video digital output signal representative thereof for transmission in digital form to a viewfinder for said camera and for providing bidirectional communication between said camera unit and said viewfinder; and
    a bus transmitting said video digital output signal from said camera unit to said viewfinder;
    said viewfinder having a decoder supplied with said digital video output signal from said signal processing circuit of said camera unit through said bus, said decoder providing an analog output signal representative of said digital video signal thereof, and a liquid crystal display device for receiving said analog output signal from said decoder and providing an image representative thereof which is displayed on said liquid crystal display device wherein said decoder comprises a digital circuit IC.

3. A video tape recorder (VTR), comprising:
    a camera unit having an imager device for receiving a light having image information and converting said light image information into an analog signal representative thereof, and a signal processing circuit having an A/D converter for converting said analog signal to a digital output signal representative thereof, and a microcomputer for controlling said signal processing circuit;
    a viewfinder for receiving said digital video signal from said signal processing circuit of said camera unit, and having a decoder driver circuit for converting said digital video signal into an analog output signal and a liquid crystal display device for receiving said decoder analog output signal and providing an output signal representative thereof; and
    a bus for transmitting said digital video signal from said signal processing circuit to said viewfinder and for transmitting adjustment signals from said viewfinder to the microcomputer in said signal processing circuit.

4. A VTR camera according to claim 3, wherein said imager device is formed of a charge-coupled device.

* * * * *